United States Patent Office 3,637,818
Patented Jan. 25, 1972

3,637,818
PROCESS FOR PREPARING MIXTURES OF ACETALDEHYDE, ACETIC ACID AND VINYL ACETATE
Hans Krekeler, Wiesbaden, Hans Fernholz, Bad Soden, Taunus, and Günter Jacobsen, Frankfurt am Main, Germany, assignors to Farbwerke Hoechst Aktiengesellschaft vormals Meister Lucius & Bruning, Frankfurt am Main, Germany
No Drawing. Continuation-in-part of abandoned application Ser. No. 460,817, June 2, 1965. This application Apr. 16, 1968, Ser. No. 721,632
Claims priority, application Germany, June 5, 1964, F 43,089
Int. Cl. C07c 67/04
U.S. Cl. 260—497 A                                          3 Claims

ABSTRACT OF THE DISCLOSURE

Preparation of mixtures of acetaldehyde, acetic acid and vinyl acetate by reacting ethylene with molecular oxygen at 20 to 200° C. and 5 to 150 atmospheres in the liquid phase in the absence of mineral acids and anions other than acetate ions and in the presence of a Group VIII noble metal, manganese and/or cobalt acetate, and water.

This application is a continuation-in-part application of our application Ser. No. 460,817 filed June 2, 1965 (now abandoned) and relates to a process for preparing mixtures of acetaldehyde, acetic acid and vinyl acetate.

It is known that ethylene can be reacted in a solution of palladium salt in water or acetic acid to obtain acetaldehyde or vinyl acetate, the palladium salt being reduced to metallic palladium. In particular, industrial processes based on these reactions use cupric salts to reoxidize the metallic palladium and keep it in solution, and molecular oxygen for reconverting the cuprous salts that form to the bivalent stage. It is also known that vinyl acetate can be obtained from ethylene, molecular oxygen and acetic acid in the presence of a catalyst containing a noble metal in elemental form, particularly metallic palladium, whereby, besides carbon monoxide and dioxide, acetaldehyde, ethyl acetate, methyl acetate and acetone are obtained as by-products. It has also been proposed to make acetaldehyde by oxidizing ethylene with oxygen in the presence of water, using a solid catalyst containing an elemental noble metal of Group VIII of the Mendeleeff Periodic Table, particularly palladium, and advantageously adding to the water a salt having a weakly basic reaction. By this process, acetic acid is obtained as by-product in addition to carbon monoxide and dioxide.

The present invention provides a process for the manufacture of a mixture of acetaldehyde, acetic acid and vinyl acetate, which comprises reacting ethylene with molecular oxygen at a temperature within the range of 20 to 200° C., and a pressure within the range of 5 to 150 atmospheres in a liquid reaction medium in the absence of mineral acids, and anions other than acetate ions; and in the presence of an elemental noble metal of Group VIII of the Mendeleeff Periodic Table; of manganese and/or cobalt acetate; and of water as the prevailing component of the reaction mixture.

The formation of vinyl acetate is surprising since complex compounds of ethylene and palladium are known to react considerably faster with water than with acetic acid. The oxidation of ethylene in a solution of palladium salt in strongly diluted aqueous acetic acid yields substantially only acetaldehyde but no vinyl acetate.

As elemental noble metal, palladium is advantageously used. Manganese acetate is more advantageous under the same conditions than cobalt acetate.

The preferred amount of manganese and/or cobalt acetate in the liquid reaction mixture ranges between 0.1 to 10 and particularly between 0.2 to 0.8% by weight. Normally, manganese (II) acetate and/or cobalt (II) acetate are used.

The process of the invention may be carried out as follows. A pressure vessel, for example an autoclave, is charged with water and 0.1 to 5% by weight, advantageously 0.3 to 1% by weight, calculated on the water, of finely divided palladium which has been deposited on a carrier. There may be used, for example, 7.5% by weight of active carbon containing 5% by weight of palladium, and manganese (II) and/or cobalt (II) acetate in the above mentioned amount, for example 0.5% by weight of manganese (II) acetate. Instead of active carbon another carrier material may be used, for example, pumice, silica gel, aluminum oxide or aluminum silicate. The amount of noble metal on the carrier may vary within the range of, for example, 1 and 10% by weight. It is, however, also possible to use a larger or smaller amount. Into the autoclave thus charged, ethylene and oxygen and/or air are introduced until a total pressure within the range of 5 to 150 atmospheres, advantageously 40 to 80 atmospheres, has been reached. The mixing ratio ethylene:oxygen may vary within wide limits. For the sake of safety, a ratio outside the explosion limits of this mixture is chosen. In the liquid reaction mixture consisting essentially of ethylene, oxygen, water, acetaldehyde, acetic acid, vinyl acetate and the catalyst system, water is the prevailing component. The process is carried out at a temperature within the range of 20 to 200° C., advantageously 50 to 100° C. The speed of reaction is very high so that no long stay times are needed. When gas absorption is terminated, the contents of the autoclave are processed in appropriate manner for example, by distillation.

Instead of an autoclave which permits only a discontinuous mode of working, it is particularly advantageous to use a reaction tube in which water and catalyst are present in an amount that must be kept constant and into which the reactants water, ethylene and oxygen are introduced continuously as they are consumed and from which the reaction products are continuously removed. In a pressure tube in upright position a constant liquid level of water containing the dissolved metal acetate and suspended noble metal catalyst is maintained. At elevated temperature and elevated pressure such a stream of a gaseous mixture of ethylene and oxygen is conducted through in an upward direction that the reaction products which have been formed are expelled together with excess water. The reaction products are condensed and distilled while the unreacted portions of the gaseous constituents ethylene and oxygen are recycled to the reaction zone. The consumed starting materials are continuously substituted.

The following examples serve to illustrate the invention but they are not intended to limit it thereto.

COMPARISON EXAMPLE

A 1-liter shaking autoclave was charged with 200 cc. of water and 15 grams of palladium-active carbon catalyst containing 5% by weight of palladium. Ethylene and air were introduced each at 40 atmospheres, the whole was heated to 80° C. while shaking, kept at that temperature for about 15 minutes and then allowed to cool. The reaction mixture was analyzed by separating the first runnings passing over at a temperature of up to a boiling temperature of 100° C. in an effective column and determining the content of acetaldehyde. There were found 2.2 grams, corresponding to an extent of conversion of ethylene of 3.5%. No vinyl acetate or acetic acid was contained in the reaction mixture.

EXAMPLE 1

The reaction was carried out as described in Comparison Example but while adding to the water 1 gram of manganese (II) acetate. By processing the reaction mixture there were obtained 5.2 grams of acetaldehyde, 2.2 grams of vinyl acetate and 1.6 grams of acetic acid, which corresponded to an extent of conversion of ethylene of 14% an an extent of conversion of oxygen of 44%.

EXAMPLE 2

The reaction was carried out as described in the Comparison Example but while adding to the water 1 gram of cobalt (II) acetate. By processing the reaction mixture there were obtained 2.5 grams of acetaldehyde, 1.5 grams of vinyl acetate and 1.0 gram of acetic acid, which corresponded to an extent of conversion of ethylene of 7% and an extent of conversion of oxygen of 20%.

We claim:

1. A process for the manufacture of mixtures of acetaldehyde, acetic acid, and vinyl acetate which comprises reacting ethylene with molecular oxygen at a temperature from 20° C. to 200° C. and at a pressure from 5 atmospheres to 150 atmospheres in a liquid reaction medium in the absence of mineral acids and anions other than acetate ions, said liquid reaction medium consisting essentially of an aqueous solution of a metal acetate selected from the group consisting of manganese acetate, cobalt acetate, and mixtures thereof in an amount of 0.1 to 10 percent, by weight of the water in said reaction medium, and, suspended therein, from 0.1 to 5 percent, by weight of the water in said reaction medium, of elemental palladium deposited on a carrier.

2. A process as in claim 1 wherein said metal acetate is present in an amount of from 0.2 to 0.8 percent by weight of the water present.

3. A process as in claim 1 wherein said metal acetate is manganese (II) acetate.

References Cited

UNITED STATES PATENTS

| 3,221,045 | 11/1965 | McKeon et al. | 260—497 |
| 3,277,158 | 10/1966 | Schaeffer | 260—497 |
| 3,450,748 | 6/1969 | Schaeffer | 260—497 |

FOREIGN PATENTS

| 618,071 | 9/1962 | Belgium | 260—497 |
| 1,346,219 | 11/1963 | France | 260—497 A |
| 1,064,066 | 4/1967 | Great Britain | 260—497 A |

LORRAINE A. WEINBERGER, Primary Examiner

R. D. KELLY, Assistant Examiner

U.S. Cl. X.R.

260—533 R, 604 AC